US008510712B1

(12) United States Patent
Killmar, III

(10) Patent No.: US 8,510,712 B1
(45) Date of Patent: Aug. 13, 2013

(54) TESTING IN-CONTAINER SOFTWARE OBJECTS

(75) Inventor: Henry M. Killmar, III, Austin, TX (US)

(73) Assignee: Interactive TKO, Inc., Dallas, TX (US)

( * ) Notice: Subject to any disclaimer, the term of this patent is extended or adjusted under 35 U.S.C. 154(b) by 1746 days.

(21) Appl. No.: 11/725,399

(22) Filed: Mar. 19, 2007

(51) Int. Cl.
*G06F 9/44* (2006.01)
(52) U.S. Cl.
USPC .......................................... 717/124; 717/134
(58) Field of Classification Search
None
See application file for complete search history.

(56) References Cited

U.S. PATENT DOCUMENTS

| 6,633,888 | B1 * | 10/2003 | Kobayashi | 1/1 |
| 7,373,632 | B1 * | 5/2008 | Kawaguchi et al. | 717/100 |
| 7,647,584 | B2 * | 1/2010 | Sluiman | 717/124 |
| 7,992,133 | B1 * | 8/2011 | Theroux et al. | 717/124 |

OTHER PUBLICATIONS

Craig, "In Brief: iTKO releases LISA 3 for complete SOA testing," InfoWorld, Mar. 16, 2006.*
"Testing: Cactus and JUnit," Jun. 16, 2003.*
Santos et al., "A Framework for Smart Proxies and Interceptors in RMI," CiteSeerX, 2002.*
Jia, "Unit test Struts applications with mock objects and AOP," JavaWorld.com, Nov. 9, 2006.*
Mackinnon et al., "Endo-Testing: Unit Testing with Mock Objects," 2000.*
"MockEJB Documentation" MockEJB project & Alexander Ananiev, 2004.*
"J2EEUnit Architecture," Copyright © 2000-2001 Vincent Massol.*
Obermeyer et al., "Microsoft .NET Remoting: A Technical Overview," Microsoft, Jul. 2001.*
McCune, "Container-free Testing with Mockrunner," Sep. 13, 2005.*
Johnson, "Introduction to the Spring Framework," TheServerSide.com, May 1, 2005.*
"Professional Java™ Development with the Spring Framework," Wiley Publishing, 2005.*
Grehan, "LISA smiles on J2EE app testers," 2005.*
Using JMock in Test Driven Development, Copyright 2000-2012.*
"Dynamic Proxy Classes," http://java.sun.com/j2se/1.3/docs/guide/reflection/proxy.html, printed Aug. 6, 2007, pp. 1-10, Copyright © 1999 Sun Microsystems, Inc.
"Cactus, The thorn in your bug's side," *How It Works*, Docs for: v 1.8dev/v1.7.2, Last update: Mar. 26, 2006, http://jakarta.apache.org/cactus/how_it_works.html, printed Aug. 6, 2007, pp. 1-4, Copyright © 2000-20004 the Apache Software Foundation.
"Cactus, The thorn in your bug's side," *Project Description*, Docs for: v1.8dev/v1.7.2, Last update: Mar. 26, 2006, http://jakarta.apache.org/cactus/, printed Aug. 6, 2007, pp. 1-2, Copyright © 2000-20004 The Apache Software Foundation.
LISA, 2.0 User's Guide, Interactive TKO, Feb. 27, 2003, pp. 1-130.
LISA, 2.0 Developer's Guide, Interactive TKO, Mar. 13, 2003, pp. 1-23.

* cited by examiner

*Primary Examiner* — Insun Kang
(74) *Attorney, Agent, or Firm* — Patent Capital Group

(57) ABSTRACT

Various techniques for testing in-container software objects are disclosed. For example, one method involves invoking a proxy method of a proxy object within a testing process. In response to the proxy method of the proxy object being invoked, a request is sent to a container, which is separate from the testing process. The request includes a request to invoke a method of an object within the container. The proxy object represents the object within the container. The proxy object can be used to test the corresponding object, which is represented by the proxy object, within the container.

27 Claims, 5 Drawing Sheets

TESTING IN-CONTAINER SOFTWARE OBJECTS

FIELD OF THE INVENTION

This invention relates to testing and, more particularly, to systems for testing in-container software objects.

DESCRIPTION OF THE RELATED ART

As software becomes more sophisticated, it becomes more difficult to quickly and easily perform thorough software testing. For example, software "containers" are independent environments in which applications can execute. Examples of containers include Java 2 Platform, Enterprise Edition (J2EE or JavaEE) containers such as those provided in product families such as WebLogic™, WebSphere™, and JBoss™, as well as widget toolkits, such as Swing applications using the Java™ Swing toolkit, that provide a framework for creating user interfaces.

Testing code within a container is often difficult. In general, a container is an independent process in which container-dependent code is deployed. Applications designed to be executed within a container depend upon the container and cannot be tested independently of the container. At the same time, external tests (i.e., tests that execute outside of the container) are not part of the container's process, and thus do not have visibility into the container. In other words, an external test will execute in a different process than the container, and thus the external test cannot interact with individual objects within the container. Accordingly, external tests cannot adequately test objects that are executing within the container (such objects are referred to herein as "in-container objects"), since those objects are effectively invisible to the external tests.

Because of the above characteristics of software that executes in containers, existing techniques for testing in-container objects have required container-specific test code that is deployed within the container. If the test code needs to be modified, the modified test code must be redeployed and the container restarted. Because of these restrictions, existing techniques for performing in-container testing can be laborious, error prone, and/or inefficient. Accordingly, new techniques for testing in-container objects are desired.

BRIEF DESCRIPTION OF THE DRAWINGS

A more complete understanding of the present invention may be acquired by referring to the following description and the accompanying drawings, in which like reference numbers indicate like features.

Figure 1:
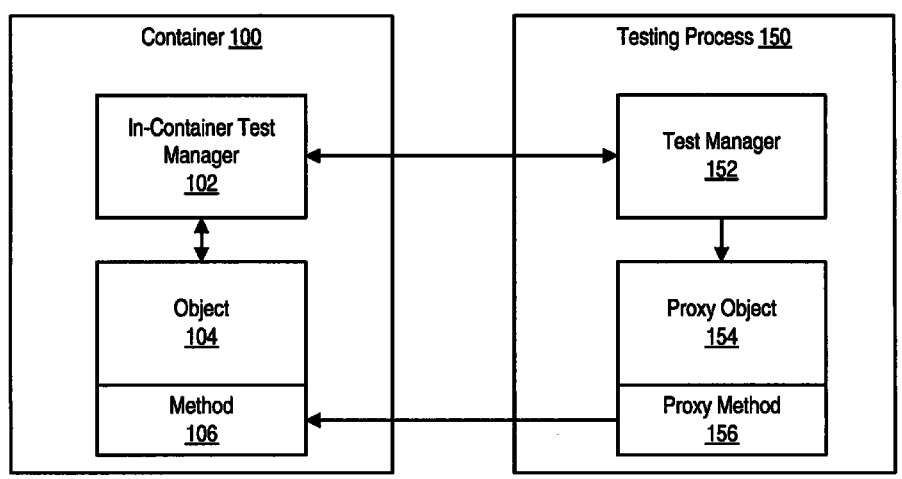
FIG. 1 is a block diagram of a system that performs in-container testing, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a system that performs in-container testing. As shown, container 100 includes an in-container test manager 102 as well as an object 104. Object 104 implements a method 106. Container 100 is an example of a software container that provides a framework in which other software components (e.g., Enterprise JavaBeans (EJBs)™, Web components such as JavaServer Pages (JSP) pages and Java servlet components, other standalone Java components, Java applets, applications that include any of the previously-mentioned components, and so on) can execute. Container 100 manages the execution of in-container components such as object 104. Container 100 can also provide services (e.g., such as handling underlying tasks such as multithreading, transaction and state management, resource pooling, and the like to in-container components. A container can be designed to manage a specific type of components (e.g., EJBs, Web components, applets, and the like).

FIG. 1 also shows a testing process 150. Testing process 150 includes a test manager 152 and a proxy object 154. Proxy object 154 implements a proxy method 156.

In-container test manager 102 is generic to the type of container used to implement container 100 (e.g., if container 100 is a J2EE container, in-container test manager 102 can be designed for use within J2EE containers). In-container test manager 102 is configured to detect classes that are implemented within container 100 and to provide information identifying those classes to test manager 152. In-container test manager 102 can identify Enterprise JavaBeans™ as well as other Java™ classes deployed within container 100. In-container test manager 102 can also instantiate, manipulate, and delete objects within container 100 in response to requests from testing process 150, as well as provide information indicating the results of instantiating, manipulating, or deleting in-container objects to testing process 150. Thus, in-container test manager 102 provides test manager 152 with visibility into container 100 as well as the ability to manipulate and monitor the behavior of objects within container 100.

Testing process 150 is implemented independently of container 100. Thus, testing process 150 can be modified without having to stop and restart container 100 and without having to redeploy any code into container 100. A user can thus modify testing process 150 or dynamically change the flow of testing being performed by testing process 150 without needing to redeploy any test code or to restart container 100. At the same time, because testing process 150 can communicate with in-container test manager 102, testing process 150 has the ability to interact with in-container objects individually.

As noted above, testing process 150 gains visibility into container 100 by communicating with in-container test manager 102. In one embodiment, test manager 152 is configured to communicate with in-container test manager 102. For example, when testing process 150 is initiated, test manager 152 can send a request for a list of in-container classes to in-container test manager 102. In response, in-container test manager 102 returns a list of available classes to test manager 152.

Test manager 152 can display the available classes, which were identified by in-container test manager 102, to a user. If a user selects to test one of the available classes, test manager 152 instantiates a proxy object corresponding to that class within the testing process environment and instructs in-container test manager 102 to instantiate an object of the selected class within container 100. Both the in-container object and the proxy object can be instantiated and deleted on the fly, in response to test code execution and/or user input.

In this example, object 104 and proxy object 154 have been instantiated within container 100 and testing process 150 respectively. Proxy object 154 corresponds to object 104, which is an in-container object within container 100. As shown, proxy object 154 implements a proxy method 156, which corresponds to method 106 of object 104.

Proxy object 154 and object 104 can be instantiated in response to a user request or test case execution that selects one of the in-container classes for test. When such a selection is made, test manager 152 instantiates a proxy object 154 corresponding to that class and also requests that in-container test manager 102 instantiate corresponding object 104 of the selected class within container 100. It is noted that the order in which object 104 and proxy object 154 are instantiated can vary (e.g., in some situations, proxy object 154 can be instantiated prior to instantiation of object 104 or vice versa).

The proxy methods to implement within a given proxy object are identified by in-container test manager 102, which can provide a list of methods implemented by each class that is available within container 100. In-container test manager 102 can provide this list as either part of the information that identifies all available classes within the container or as a class-specific list (e.g., such a class-specific list can be provided to testing process 150 in response to instantiating an object from that class). For each method implemented by the in-container object, testing process 150 will implement a proxy method within the corresponding proxy object.

Because proxy object 154 is implemented within the testing process environment, testing process 150 can manipulate and monitor proxy object 154 directly. In contrast, object 104 cannot be manipulated or monitored directly by testing process 150, since object 104 is implemented within container 100.

Proxy object 154 is implemented using reflection, such that a method call to one of the proxy object's proxy methods will be "reflected" to the corresponding in-container object. Thus, while testing process 150 can manipulate a proxy object in the same manner as any other object within the testing process, such activity will effectively cause the in-container object to be manipulated.

In one embodiment, proxy objects like proxy object 154 are instantiated from the Java™ class java.lang.reflect.Proxy. Objects of this class behave in a manner that dynamically presents an interface to a remote object. Invoking a proxy method of a proxy object causes the method call to be sent to the remote object via the interface provided by the proxy object. Thus, when a user selects to invoke proxy method 156 as part of a test, that method invocation will be reflected to object 104 and cause corresponding method 106 to be invoked, as indicated by the arrow leading from proxy method 156 to method 106.

If proxy method 156 is invoked using the identifier (ID) of proxy object 154 and the name of proxy method 156 (e.g., "proxyObject.myMethod( )", where "proxyObject" is the proxy object), that method invocation will be translated to the ID of the corresponding in-container object 104 and the same method 106 (e.g., "object.myMethod( )"). In some embodiments, this translation can be performed automatically (e.g., due to proxy object 154 being implemented as a proxy object). Alternatively, the translation can be performed by test manager 152. Once the translation has been performed, the translated ID and method name are sent to container 100, causing in-container test manager 102 to retrieve the identified object and invoke the named method. As noted below, the ID of in-container object 104 can be assigned to object 104 by in-container test manager 102.

When a method of an in-container test object is invoked due to reflection from a proxy object, in-container test manager 102 can monitor the results and return those results to test manager 152. For example, if a method that returns a result is invoked, in-container test manager 102 can return that result to test manager 152. If the result returned by invoking the in-container method is an object, that object can be represented by a proxy object in test manager 152.

In addition to monitoring results, in-container test manager 102 can also monitor other conditions within container 100 during the test process and return information identifying those conditions to test manager 152. For example, in-container test manager 102 can obtain session keys from existing session objects within container 100, monitor memory usage within the container 100, and the like.

In one embodiment, testing process 150 is implemented using LISA (Live Interaction Service Architecture)™, available from iTKO, Inc. of Dallas, Tex. In this embodiment, testing process 150 provides a user interface that allows a user to dynamically test software by manipulating objects under test. Here, testing process 150 can provide a user with a list of available classes. If a user selects to test a particular class, testing process 150 dynamically instantiates an object of that class and displays the instantiated object, as well as each method implemented by the object, to the user. The user can then select to invoke methods within the instantiated object and view the results of invoking those methods. It is noted that a user can instantiate and test multiple objects simultaneously in order to observe the interactions between multiple objects. In this embodiment, the user can dynamically alter the flow of testing.

In other embodiments, testing process 150 is a testing process that includes prespecified test cases that instantiate and manipulate one or more objects. In these embodiments, the flow of testing is predetermined.

In-container test manager 102 can, in one embodiment, be implemented as an Enterprise JavaBean (EJB) that is configured to be deployed within a J2EE container. In one embodiment, different types of in-container test managers are provided for use with different types of containers. For example, the developer of the testing software can supply different in-container test managers for use with Swing applications or other widget applications as well as for use with Web containers, applet containers, EJB containers, and the like. Similarly, different in-container test managers can be provided for use with different container platforms (e.g., J2EE, WebLogic™, WebSphere™, Enhydra™, and JBoss™, and the like).

It is noted that FIG. 1 illustrates a specific example. In other embodiments, different components can be used to implement the testing functionality described above. For example, while specific software components have been described as implementing specific functionality, this functionality can be implemented by different components than those depicted herein. For example, the functionality of test manager 152 can be subdivided into multiple other test management components or integrated into another component within testing process 150. Furthermore, the specific components depicted in FIG. 1 can be combined or subdivided into fewer or additional components.

Additionally, other components can be used instead of and/or in addition to those shown in FIG. 1. Such other components can provide different or additional functionality instead of and/or in addition to the functionality described herein.

Furthermore, some of the functionality described herein can be eliminated in some embodiments. For example, in an alternative embodiment, in-container test manager can simply support manipulation of objects within container 100 and return the results of those manipulations to testing process 150 without providing information regarding the availability of classes within container 100. In such an embodiment, a list of the classes available within the container (and the methods available within each class) is manually generated and supplied to testing process 150 (as opposed to being collected by in-container test manager 102). Testing process 150 can then use this information to request instantiation of objects of these classes and to instantiate corresponding proxy objects. This embodiment simplifies the implementation of in-container test manager; however, for testing process 150 to have the most up-to-date information, it may also be desirable for a user to manually update the list of available classes within the container each time that classes are added to or removed from the container.

Figure 2:
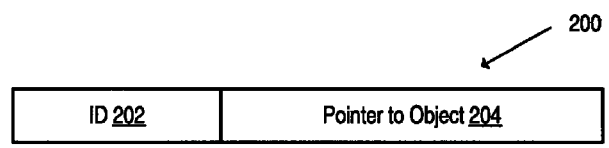
FIG. 2 shows information that can be maintained by an in-container test manager, according to one embodiment of the present invention.

FIG. 2 shows information 200 that can be maintained by an in-container test manager for each object-under-test (such as object 104 of FIG. 1) instantiated within a container. As noted above, an in-container test manager (e.g., in-container test manager 102 of FIG. 1) can instantiate, manipulate, and delete objects within a container in which the in-container test manager is deployed. Whenever an object is instantiated, the in-container test manager keeps track of that object by storing information 200, which includes the object's unique identifier (ID) 202 as well as a pointer 204 to the object's location.

ID 202 uniquely identifies the instantiated object within the container. This identifier can be assigned by the in-container test manager. The in-container test manager and the remote test manager within the testing process use ID 202 to identify the in-container object.

Pointer 204 points to the location in memory at which the instantiated object is located. This pointer allows the in-container test manager to retrieve the instantiated object in order to manipulate the object (e.g., by invoking a method within the object or deleting the object).

Whenever the in-container test manager receives a request (e.g., a request that has been generated by translating a request to manipulate a proxy object, as described above) from the testing process that identifies a particular in-container object, the in-container test manager accesses information 200 in order to obtain the pointer 204 associated with the object's ID 202. The in-container test manager can then use pointer 204 to access the identified object and perform the manipulations requested by the testing process.

It is noted that the in-container test manager can maintain multiple sets of information 200, one for each instantiated object-under-test within the container. As new objects are instantiated, new sets of information can be created. As existing objects are deleted, existing sets of information can be removed. This information can be stored in a table, hash table, linked list, tree, or other appropriate data structure. The in-container test manager can search this data structure based upon object ID.

FIGS. 3A-3D are flowcharts of methods that can be performed by an in-container test manager such as in-container test manager 102 of FIG. 1. It is noted that some embodiments may implement some but not all of these methods.

In general, once deployed within the container, the in-container test manager begins "listening" for requests from the testing process (e.g., by monitoring a particular software port designated for communication with the testing process). Thus, each method of FIGS. 3A-3D begins with the in-container test manager waiting for a request from the testing process.

Figure 3A:
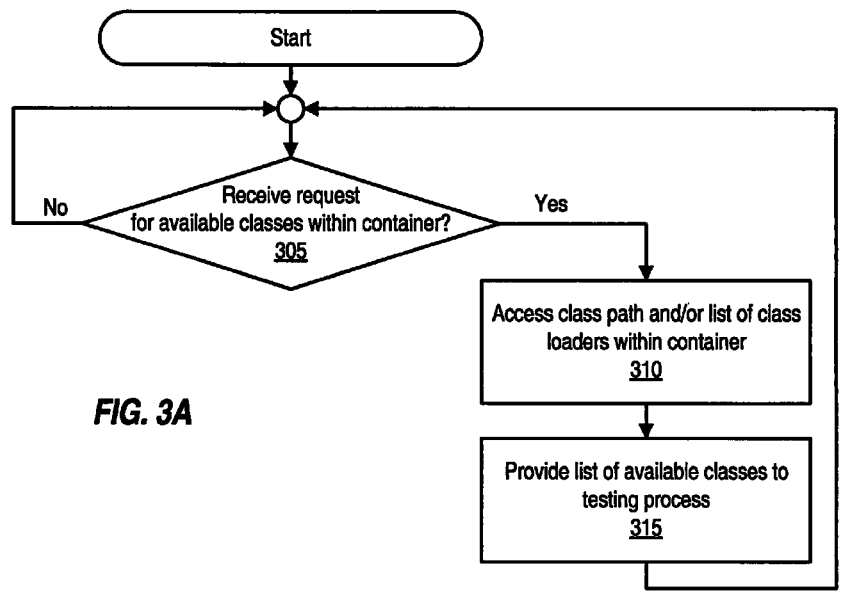
FIG. 3A is a flowchart of a method of identifying objects within a container, according to one embodiment of the present invention.

FIG. 3A is a flowchart of a method of providing visibility into a container. The method of FIG. 3A begins at 305. If the in-container test manager receives a request for the available classes within the container, as detected at 305, the in-container test manager will access metadata within the container in order to identify the available classes. For example, as shown at 310, the in-container test manager can access the class path and/or list of class loaders within the container. The in-container test manager can use existing Java™ application programming interfaces (APIs) to access this metadata.

The in-container test manager parses the metadata and extracts information identifying each class available within the container. The in-container test manager then returns the information identifying the identified classes to the testing process, as shown at 315. It is noted that, in some embodiments, this list can also include other information. For example, the list can identify each method implemented by each identified class.

Figure 3B:
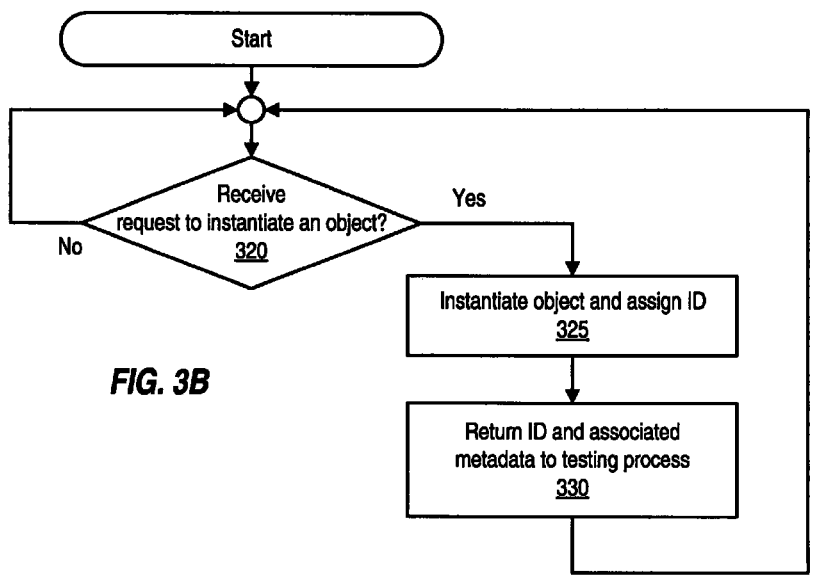
FIG. 3B is a flowchart of a method of initiating a test of an in-container object, according to one embodiment of the present invention.

FIG. 3B is a flowchart of a method of initiating a test of an in-container object. In this method, the in-container test manager waits for the testing process to generate a request to instantiate an in-container object, as shown at 320. Such a request will include the name of the class from which the object should be instantiated.

If such a request is received, the in-container test manager instantiates an object of the specified class, as shown at 325. The in-container test manager also assigns a unique identifier to the instantiated object. The in-container test manager can store the assigned identifier as well as a pointer to the instantiated object's location within a table or other data structure in memory, as described above with respect to FIG. 2.

Once the object has been instantiated, the in-container test manager returns the object's identifier to the testing process, as shown at 330. The in-container test manager can also return a list of metadata associated with the object (e.g., such as a list of methods implemented within the object) to the testing process.

Figure 3C:
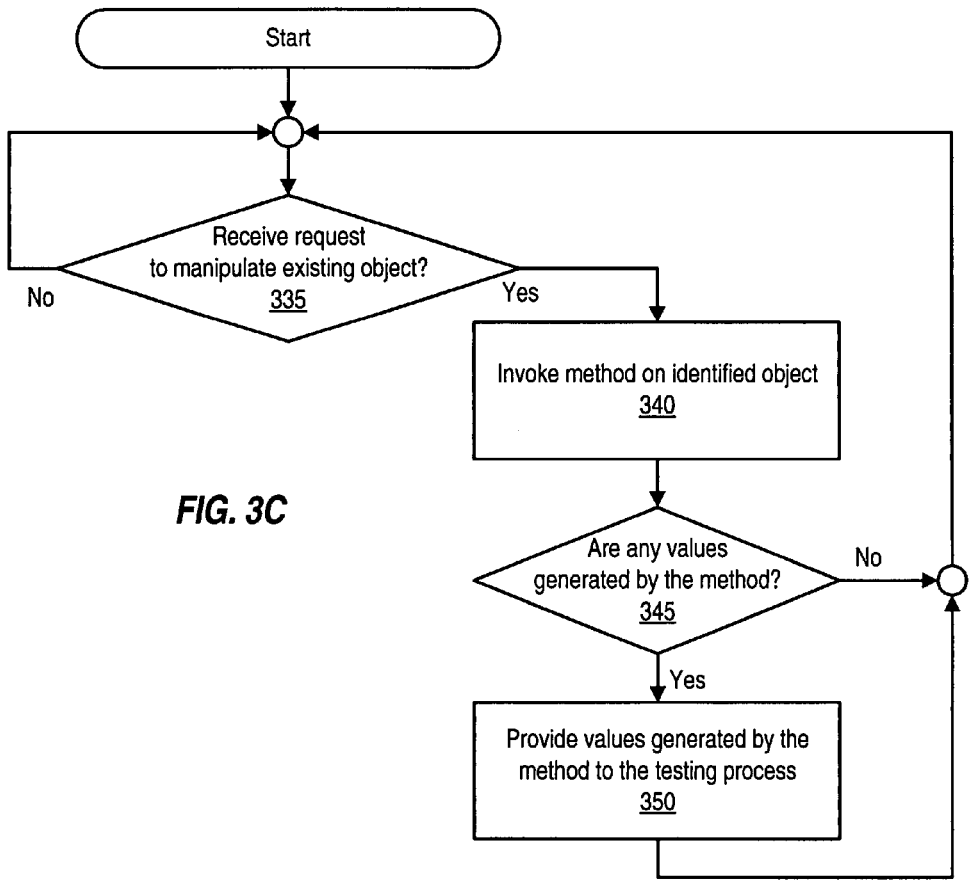
FIG. 3C is a flowchart of a method of testing an in-container object, according to one embodiment of the present invention.

FIG. 3C is a flowchart of a method of testing an in-container object. This method begins with the in-container test manager waiting for a request to manipulate (e.g., by invoking a method of) an existing in-container object. Such a request will include the identifier assigned to the object by the in-container test manager (e.g., by performing operation 325 of FIG. 3B). Such a request can be generated by a proxy method of a proxy object, which corresponds to the in-container object, being invoked within the testing process.

If the in-container test manager receives a request to manipulate an existing object, the in-container test manager will look up the identifier contained in the request and use the associated pointer to access the in-container object. The in-container test manager will then perform the requested manipulation. For example, the in-container test manager can invoke a method on the identified object, as shown at 340.

If a result is generated during the process of manipulating the in-container object, the in-container test manager can capture this result and return information identifying the result to the testing process. For example, if the method invoked at 340 generates a value, as determined at 345, the resulting values can be returned to the testing process, as shown at 350.

Figure 3D:
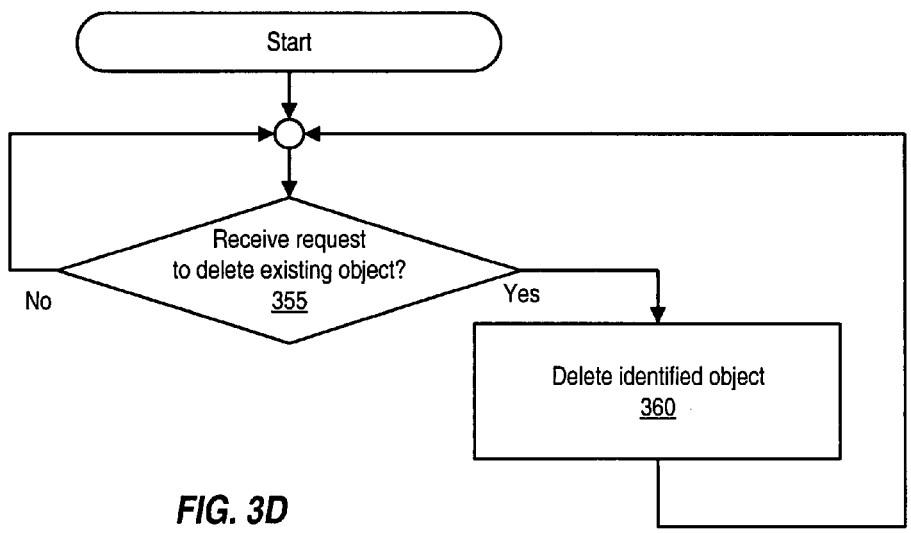
FIG. 3D is a flowchart of a method of ending a test of an in-container object, according to one embodiment of the present invention.

FIG. 3D is a flowchart of a method of ending a test of an in-container object. This method begins with the in-container test manager waiting to receive a request to delete an existing object. Such a request will include the identifier assigned to the object. If such a request is received, the in-container test manager will look up the identifier contained in the request in order to obtain the pointer associated with the object. The in-container test manager uses the pointer to access the identified object. The in-container test manager can then delete the identified object, as shown at 360.

Figure 4:
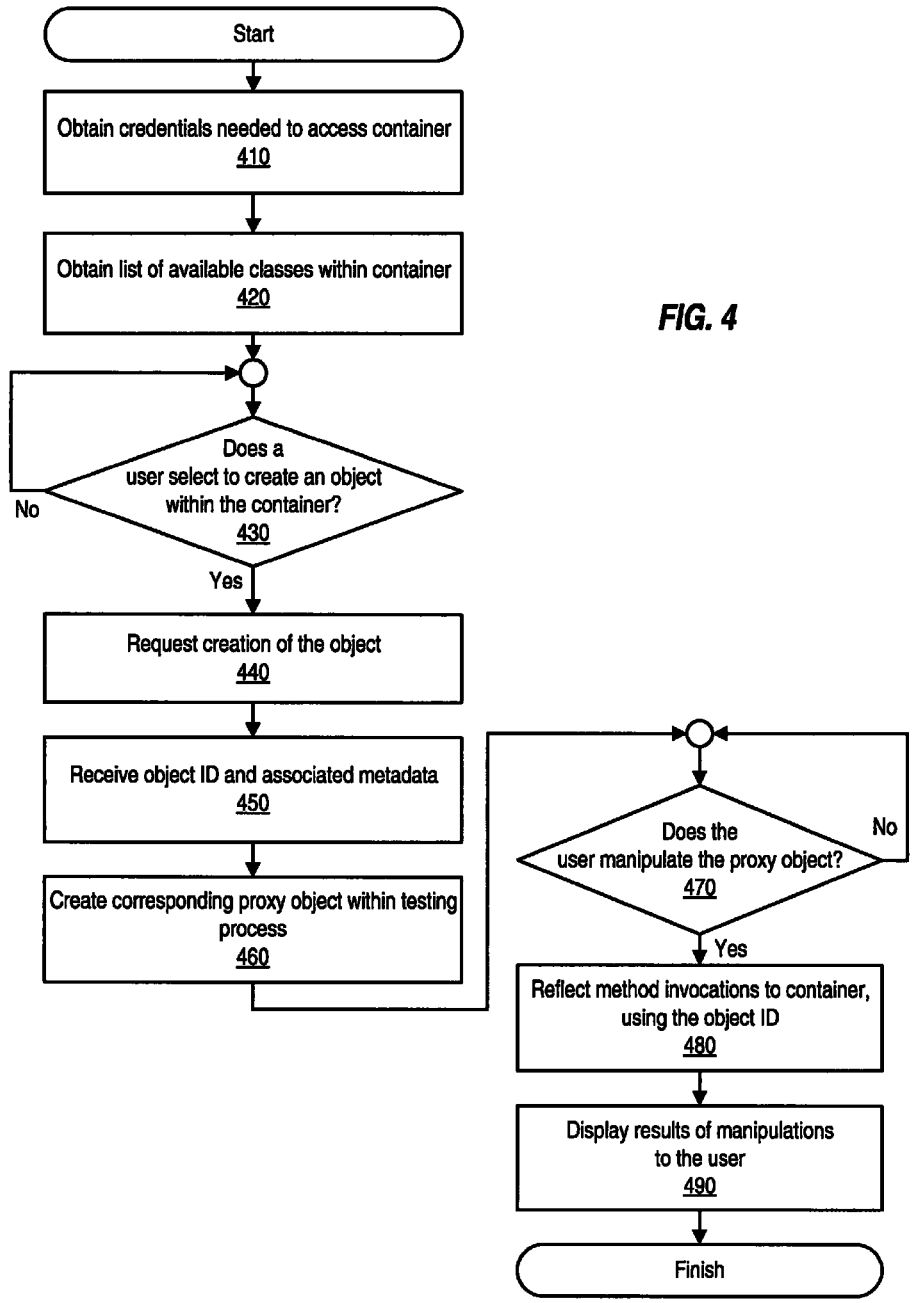
FIG. 4 is a flowchart of a method of testing an in-container object, according to one embodiment of the present invention.

FIG. 4 is a flowchart of a method of testing an in-container object. This method can be performed by a testing process (e.g., testing process 150) that is executing outside of the container in which the in-container object is included.

The method begins at 410, when the testing process obtains any credentials necessary to access the container. For example, the testing process can prompt a user to enter the network address and port number associated with the container. If additional credentials are required (e.g., if the container is implemented within a corporate intranet that is not publicly available), the testing process can also prompt the user for a username and/or password (or other security information) usable to gain access to the container. Alternatively, instead of being received dynamically from a user, such credentials can be obtained via configuration information that is encoded within a test case executing as part of the testing process.

At 420, the testing process obtains a list of classes that are available within the container. The testing process can obtain this information by sending a request to an in-container test manager within the container, using the credentials obtained at 410.

Once the list of available classes has been obtained, the testing process can display these classes to a user. If a user selects to instantiate an object within the container (e.g., by selecting one of the available classes, as displayed by the testing process), as determined at 430, the testing process will generate a request to create the selected object (440) and provide this request to an in-container test manager. The in-container test manager can then instantiate the selected object, as shown in the method of FIG. 3B.

After requesting the creation of a selected object is requested, the testing process will receive an object identifier (ID) of the selected object as well as metadata associated with the selected object, as shown at 450. The associated metadata can identify various characteristics of the selected object, such as the methods implemented by the selected object (it is noted that this metadata can alternatively be obtained as part of the information obtained in operation 420, instead of or in addition to being received as part of operation 450). The testing process will subsequently use this ID to refer to the object when communicating with the in-container test manager.

The testing process then creates a proxy object corresponding to the in-container object, as shown at 460. For each method implemented within the in-container object, the proxy object will contain a corresponding proxy method. The proxy object is implemented in such a manner that any attempt to invoke a proxy method of the proxy object will result in the invocation of the corresponding method of the in-container object. The proxy object is instantiated within the testing process, allowing the testing process to manipulate the proxy object directly.

If the user selects to manipulate the proxy object (e.g., by invoking a proxy method of the proxy object), as determined at 470, the manipulations will be "reflected" to the container (480). Reflecting the manipulations involves translating the proxy object identifier to the identifier of the in-container object. If a proxy method is being invoked, the proxy method's name is translated to the name of the corresponding method of the in-container object. If there are any parameters being provided as part of a method call, these parameters will also be provided to the in-container object.

The results of the manipulation of the in-container object are monitored by an in-container test manager and returned to the testing process. The testing process can then display information indicating these results to the user, as shown at 490. It is noted that such results can be provided as inputs to other test components, recorded (e.g., in a log file), or otherwise consumed instead of or in addition to being displayed to a user.

It is noted that, in some embodiments, operations 410, 420, 430, and 470 are optional. For example, in an alternative embodiment, the list of available classes and access credentials can be manually provided to the testing process or coded into the testing process, making it unnecessary to request such credentials or available classes from a user or in-container test manager. Additionally, in some embodiments, the flow of testing is prespecified (as opposed to being dynamically determined based upon user interaction within the testing process), and thus objects will be instantiated and/or manipulated as needed to satisfy the prespecified test flow, instead of being instantiated on-the-fly in response to user input.

Thus, some embodiments may not implement all of the operations shown in FIG. 4. Furthermore, other operations can be implemented instead of and/or in addition to those methods shown in FIG. 4.

Figure 5:
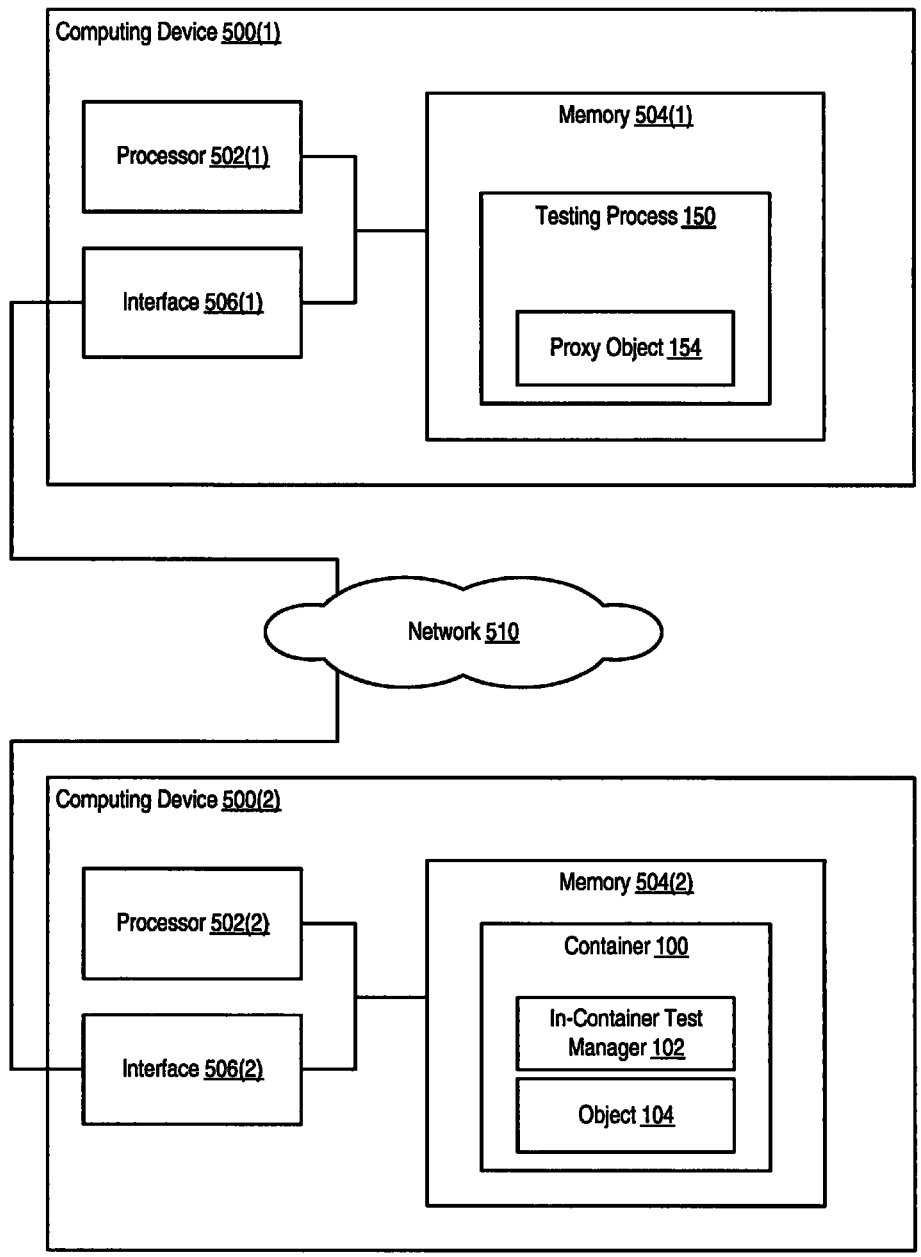
FIG. 5 is a block diagram of a system that implements a testing process as well as an in-container object under test.

FIG. 5 is a block diagram of a system that implements a testing process as well as an in-container object under test. As shown, two computing devices 500(1) and 500(2) (collectively referred to as computing devices 500) are coupled by network 510. Network 510 can include a local area network (LAN) and/or wide area network (WAN) and can be implemented using one or more of a variety of different connection media (e.g., wireless links, optical links, coaxial cable, and the like). Each computing device 500 can be a personal computer, server, personal digital assistant, cell phone, laptop, workstation, or the like.

Computing device 500(1) includes one or more processors 502(1) (e.g., microprocessors, PLDs (Programmable Logic Devices), or ASICs (Application Specific Integrated Circuits)) configured to execute program instructions stored in memory 504(1). Similarly, computing device 500(2) includes one or more processors 502(2) configured to execute program instructions stored in memory 504(2). Memories 504(1) and 504(2) can each include various types of RAM (Random Access Memory), ROM (Read Only Memory), Flash memory, MEMS (Micro Electro-Mechanical Systems) memory, and the like.

Computing device 500(1) also includes one or more interfaces 506(1), and computing device 500(2) includes one or more interfaces 506(2). In each computing device 500, the respective processor(s), memory (or memories), and interface(s) are coupled to send and receive data and control signals by a bus or other interconnect.

Interfaces 506(1) and 506(2) can each include an interface to a storage device on which instructions and/or data included are stored. Interfaces 506(1) and 506(2) can also each include an interface to a network, such as network 510, for use in communicating other devices. Interfaces 506(1) and 506(2) can also include interfaces to various peripheral Input/Output (I/O) devices, such as a monitor, on which a graphical interface (e.g., allowing a user to interact with a test case or view test results) can be displayed.

In this example, program instructions and data implementing a testing process 150, which includes a proxy object 154, are stored in memory 504(1) of computing device 500(1). As noted above, testing process 150 is a testing tool that is configured to test software (such software is referred to as software under test). In some such embodiments, testing process 150 is an off-the-shelf testing tool (e.g., a software application available from a third-party vendor, as opposed to a testing tool that was completely designed in-house by the creators of the software under test). For example, in one embodiment, testing process 150 is LISA (Live Interaction Service Architecture)™, available from iTKO, Inc. of Dallas, Tex. Testing process 150 can be a functional test tool (e.g., a test tool that is designed to verify whether the system under test is functioning as intended), a performance test tool (e.g., to measure how the system under test performs under certain conditions), or a test tool that gathers significant metrics describing the operation of the system under test.

Program instructions and data implementing a container 100 are stored in memory 504(2) of computing device 500(2). An object 104 and in-container test manager 102 have been deployed within container 100.

It is noted that the program instructions and data implementing testing process 150 and/or in-container test manager 102 can be stored on various computer readable media such as memory 504(1) and/or 504(2). In some embodiments, testing process 150 and/or in-container test manager 102 can be stored on a computer readable storage medium such as a CD (Compact Disc), DVD (Digital Versatile. Disc), hard disk, optical disk, tape device, floppy disk, and the like. In order to be executed by processor 502(1) and/or 502(2), the instructions and data implementing testing process 150 and/or in-container test manager 102 are loaded into memory from the other computer readable storage medium. The instructions and/or data implementing testing process 150 and/or in-container test manager 102 can also be transferred to a computing device for storage in memory via a network such as the Internet or upon a carrier medium.

While FIG. 5 shows the testing process 150 and container 100 as being implemented on different computing devices that are coupled by a network, it is noted that testing process 150 and container 100 can also be implemented on the same computing device. Thus, the testing process 150 and container 100 can be coupled in a variety of different ways.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A method comprising:
   identifying a particular object class to be tested, wherein objects of the particular object class are configured to execute within a container and implement a set of methods;
   requesting a testing module within the container to instantiate a particular object of the particular object class within the container;
   instantiating, using a processor device, a proxy object of the particular object class within a testing process separate from the container;
   invoking a proxy method of the proxy object within the testing process, the proxy method corresponding to a particular one of the set of methods; and
   sending a request to the testing module within the container, in response to the invoking the proxy method of the proxy object, wherein
      the request comprises a request to invoke the particular method of the particular object within the container based on the invoking of the proxy method of the proxy object, and
      the proxy object represents the particular object within the container.

2. The method of claim 1, further comprising:
   sending the testing module within the container a request for a list of available object classes implemented within the container.

3. The method of claim 2, further comprising:
   displaying the list of available object classes to a user; and
   creating the proxy object in response to the user selecting one of the available classes.

4. The method of claim 1, wherein
   instantiating the proxy object comprises:
      sending a testing module within the container a request to create the particular object; and
      receiving an identifier corresponding to the particular object.

5. The method of claim 4, wherein
   the request to invoke the method comprises the identifier.

6. The method of claim 4, wherein
   instantiating the proxy object further comprises receiving a list of the set of methods implemented by the particular object, and
   for each method identified in the list of methods, the proxy object comprises a corresponding proxy method.

7. A method comprising:
   instantiating, using a processor device, an object within a container, in response to receiving a request to create the object from a testing process attempting to perform a test involving the object, wherein the testing process is separate from the container and the object is configured to execute within the container and implement a set of methods;
   assigning an identifier to the object;
   sending the identifier to the testing process; and
   receiving a request to invoke a particular one of the set of methods, wherein the request to invoke corresponds to an invocation of a proxy method of a proxy object within the testing process, the proxy object represents the object within the container, and the proxy method corresponds to the particular method.

8. The method of claim 7, further comprising:
   sending information to the testing process, wherein the information identifies a plurality of methods of the object.

9. The method of claim 7, further comprising:
sending information to the testing process, wherein the information identifies a plurality of object classes that are available within the container.

10. The method of claim 7, further comprising:
receiving a request to invoke a method of the object, wherein
the request is received from the testing process, and
the request comprises the identifier.

11. The method of claim 10, further comprising:
returning a value generated by the method to the testing process.

12. The method of claim 10, further comprising:
returning information identifying a characteristic of the container to the testing process.

13. The method of claim 10, wherein
the request to invoke the method is generated by invoking a proxy method of a proxy object, and
the proxy object is instantiated within the testing process.

14. A non-transitory computer readable storage medium comprising program instructions executable to:
identify a particular object class to be tested, wherein objects of the particular object class are configured to execute within a container and implement a set of methods;
request a testing module within the container to instantiate a particular object of the particular object class within the container;
instantiate a proxy object of the particular object class within a testing process separate from the container;
invoke a proxy method of the proxy object within the testing process, the proxy method corresponding to a particular one of the set of methods; and
send a request to the testing module within the container, in response to the invoking the proxy method of the proxy object, wherein
the request comprises a request to invoke the particular method of the particular object within the container based on the invoking of the proxy method of the proxy object, and
the proxy object represents the particular object within the container.

15. The non-transitory computer readable storage medium of claim 14, wherein the program instructions are further executable to:
send the testing module within the container a request for a list of available object classes implemented within the container.

16. The non-transitory computer readable storage medium of claim 15, wherein the program instructions are further executable to:
display the list of available object classes to a user; and
create the proxy object in response to the user selecting one of the available classes.

17. The non-transitory computer readable storage medium of claim 14, wherein
instantiating the proxy object comprises:
sending a testing module within the container a request to create the particular object; and
receiving an identifier corresponding to the particular object.

18. The non-transitory computer readable storage medium of claim 17, wherein
creating the proxy object further comprises receiving a list of methods implemented by the object, and
for each method identified in the list of methods, the proxy object comprises a corresponding proxy method.

19. A non-transitory computer readable storage medium comprising program instructions executable to:
instantiate an object within a container, in response to receiving a request to create the object from a testing process attempting to perform a test involving the object, wherein the testing process is separate from the container and the object is configured to execute within the container and implement a set of methods;
assign an identifier to the object;
send the identifier to the testing process; and
receive a request to invoke a particular one of the set of methods of the object within the container, wherein the request to invoke corresponds to an invocation of a proxy method of a proxy object within the testing process, the proxy object represents the object within the container, and the proxy method corresponds to the particular method.

20. The non-transitory computer readable storage medium of claim 19, wherein the program instructions are further executable to:
send information to the testing process, wherein the information identifies a plurality of methods of the object.

21. The non-transitory computer readable storage medium of claim 19, wherein the program instructions are further executable to:
send information to the testing process, wherein the information identifies a plurality of object classes that are available within the container.

22. The non-transitory computer readable storage medium of claim 19, wherein the program instructions are further executable to:
receive a request to invoke a method of the object, wherein
the request is received from the testing process, and
the request comprises the identifier.

23. The non-transitory computer readable storage medium of claim 22, wherein the program instructions are further executable to:
return a value generated by the method to the testing process.

24. The non-transitory computer readable storage medium of claim 22, wherein the program instructions are further executable to:
return information identifying a characteristic of the container to the testing process.

25. The non-transitory computer readable storage medium of claim 22, wherein
the request to invoke the method is generated by invoking a proxy method of a proxy object, and
the proxy object is instantiated within the testing process.

26. A system comprising:
a processor;
a memory element;
a testing process configured, when executed by the processor, to:
identify a particular object class to be tested, wherein objects of the particular object class are configured to execute within a container and implement a set of methods;
request a testing module within the container to instantiate a particular object of the particular object class within the container;
instantiate a proxy object of the particular object class within a testing process separate from the container;
invoke a proxy method of the proxy object within the testing process, the proxy method corresponding to a particular one of the set of methods; and send a request to the testing module within the container, in response to the invoking the proxy method of the proxy object, wherein
- the request comprises a request to invoke the particular method of the particular object within the container based on the invoking of the proxy method of the proxy object, and
- the proxy object represents the particular object within the container.

27. A system comprising:

a processor;

a memory element;

a container, wherein the object is within the container, the container configured, when executed by the processor, to:
- instantiate an object within a container, in response to receiving a request to create the object from a testing process attempting to perform a test involving the object, wherein the testing process is separate from the container and the object is configured to execute within the container and implement a set of methods;
- assign an identifier to the object;
- send the identifier to the testing process; and
- receive a request to invoke a particular one of the set of methods of the object within the container, wherein the request to invoke corresponds to an invocation of a proxy method of a proxy object within the testing process, the proxy object represents the object within the container, and the proxy method corresponds to the particular method.

* * * * *